(12) United States Patent
Hsieh

(10) Patent No.: US 6,453,575 B1
(45) Date of Patent: Sep. 24, 2002

(54) MANUAL/AUTO DUAL-MODE REVERSIBLE MEASURING TAPE

(76) Inventor: Chih-Ching Hsieh, No. 64, Lane 107, Liang Tsun Rd., Fong Yuan City, Taichung Hsien (TW)

( * ) Notice: Subject to any disclaimer, the term of this patent is extended or adjusted under 35 U.S.C. 154(b) by 8 days.

(21) Appl. No.: 09/804,145

(22) Filed: Mar. 13, 2001

(51) Int. Cl.⁷ .................................................. G01B 3/10
(52) U.S. Cl. ............................ 33/761; 33/759; 33/767; 242/390.8
(58) Field of Search .......................... 33/755, 759, 760, 33/761, 762, 763, 767; 242/390.8, 394, 396

(56) References Cited

U.S. PATENT DOCUMENTS

| | | | |
|---|---|---|---|
| 3,808,692 A | * 5/1974 | Gartner | 33/759 |
| 5,044,089 A | * 9/1991 | Petkovic et al. | 242/390.2 |
| 5,440,820 A | * 8/1995 | Hwang | 33/761 |
| 5,448,837 A | * 9/1995 | Han-Teng | 33/767 |
| 5,471,761 A | * 12/1995 | Cheng | 33/755 |
| 5,743,021 A | * 4/1998 | Corcoran | 33/762 |
| 5,820,057 A | * 10/1998 | Decarolis et al. | 33/761 |
| 6,295,740 B1 | * 10/2001 | Mitchell | 33/755 |

* cited by examiner

Primary Examiner—G. Bradley Bennett
(74) Attorney, Agent, or Firm—Varndell & Varndell, PLLC

(57) ABSTRACT

A manual/auto dual-mode reversible measuring tape includes a tape marked with marks for measuring, the tape having a longitudinal series of tooth holes, a shaft coupled to the housing of the measuring tape by a slip joint, a gear fixedly mounted on the shaft and adapted to mesh with the tooth holes of the tape, a reversible direct current motor connected to a direct current power source and adapted to rotate the gear in moving the tape in and out of the housing of the measuring tape, a manual/auto control switch controlled to move the shaft between a first position where the gear is forced into engagement with the tooth holes of the tape for enabling the tape to be automatically moved in and out of the housing of the measuring tape upon rotation of the reversible direct current motor, and a second position where the gear is disengaged from the tooth holes of the tape for enabling the tape to be moved in and out of the housing of the measuring tape by hand, and switch means, which controls the connection of the direct current power source to the reversible direct current motor and direction of rotation of the reversible direct current motor.

4 Claims, 7 Drawing Sheets

MANUAL/AUTO DUAL-MODE REVERSIBLE MEASURING TAPE

BACKGROUND AND SUMMARY OF THE INVENTION

The present invention relates to measuring tapes, and more particularly, to a reversible measuring tape that can be operated manually as well as automatically.

When measuring the length of an object or the distance between two points, a measuring tape may be used. A conventional measuring tape is operated manually. For measuring a long distance beyond the reach of the hands, it requires two persons to operate the measuring tape in measuring the distance. In order to eliminate this drawback, reversible measuring tapes are developed. However, regular reversible measuring tapes can only automatically rewind the tape, they cannot be controlled to automatically extend out the tape.

The invention has been accomplished to provide a manual/auto dual-mode reversible measuring tape, which eliminates the aforesaid drawbacks. It is one object of the present invention to provide a manual/auto dual-mode reversible measuring tape, which can be controlled to automatically extend out the tape to measure a distance. It is another object of the present invention to provide a manual/auto dual-mode reversible measuring tape, which provides a manual mode and an auto mode for selection. To achieve these and other objects of the present invention, a manual/auto dual-mode reversible measuring tape is provided comprised of a tape marked with marks for measuring, the tape having a longitudinal series of tooth holes, a shaft coupled to the housing of the measuring tape by a slip joint, a gear fixedly mounted on the shaft and adapted to mesh with the tooth holes of the tape, a reversible direct current motor connected to a direct current power source and adapted to rotate the gear in moving the tape in and out of the housing of the measuring tape, a manual/auto control switch controlled to move the shaft between a first position where the gear is forced into engagement with the tooth holes of the tape for enabling the tape to be automatically moved in and out of the housing of the measuring tape upon rotation of the reversible direct current motor, and a second position where the gear is disengaged from the tooth holes of the tape for enabling the tape to be moved in and out of the housing of the measuring tape by hand, and switch means, which controls the connection of the direct current power source to the reversible direct current motor and direction of rotation of the reversible direct current motor.

BRIEF DESCRIPTION OF THE PREFERRED EMBODIMENT

Figure 1:
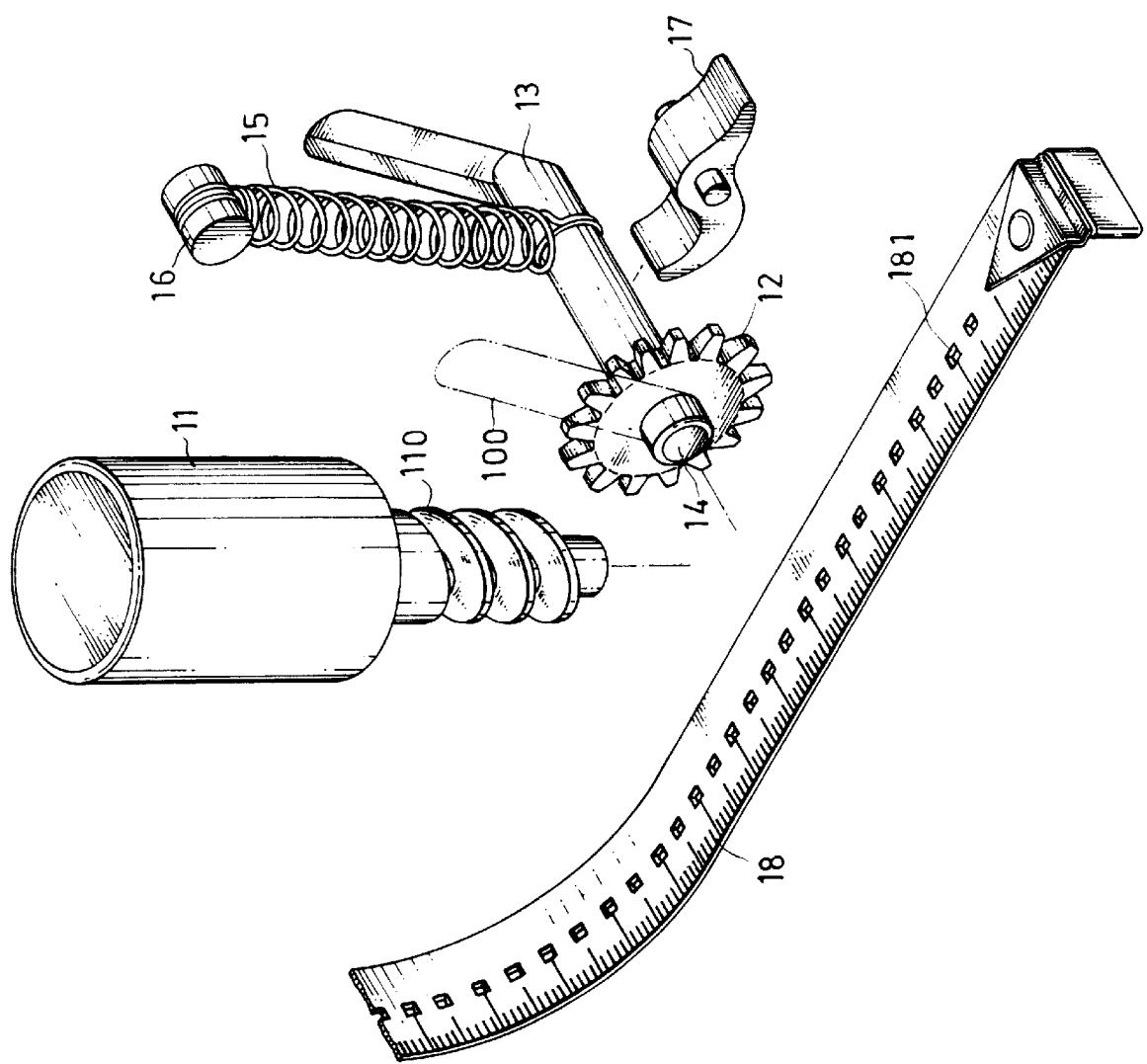
FIG. 1 is an exploded view of the internal mechanism of the manual/auto dual-mode reversible measuring tape according to the present invention.
Figure 2:
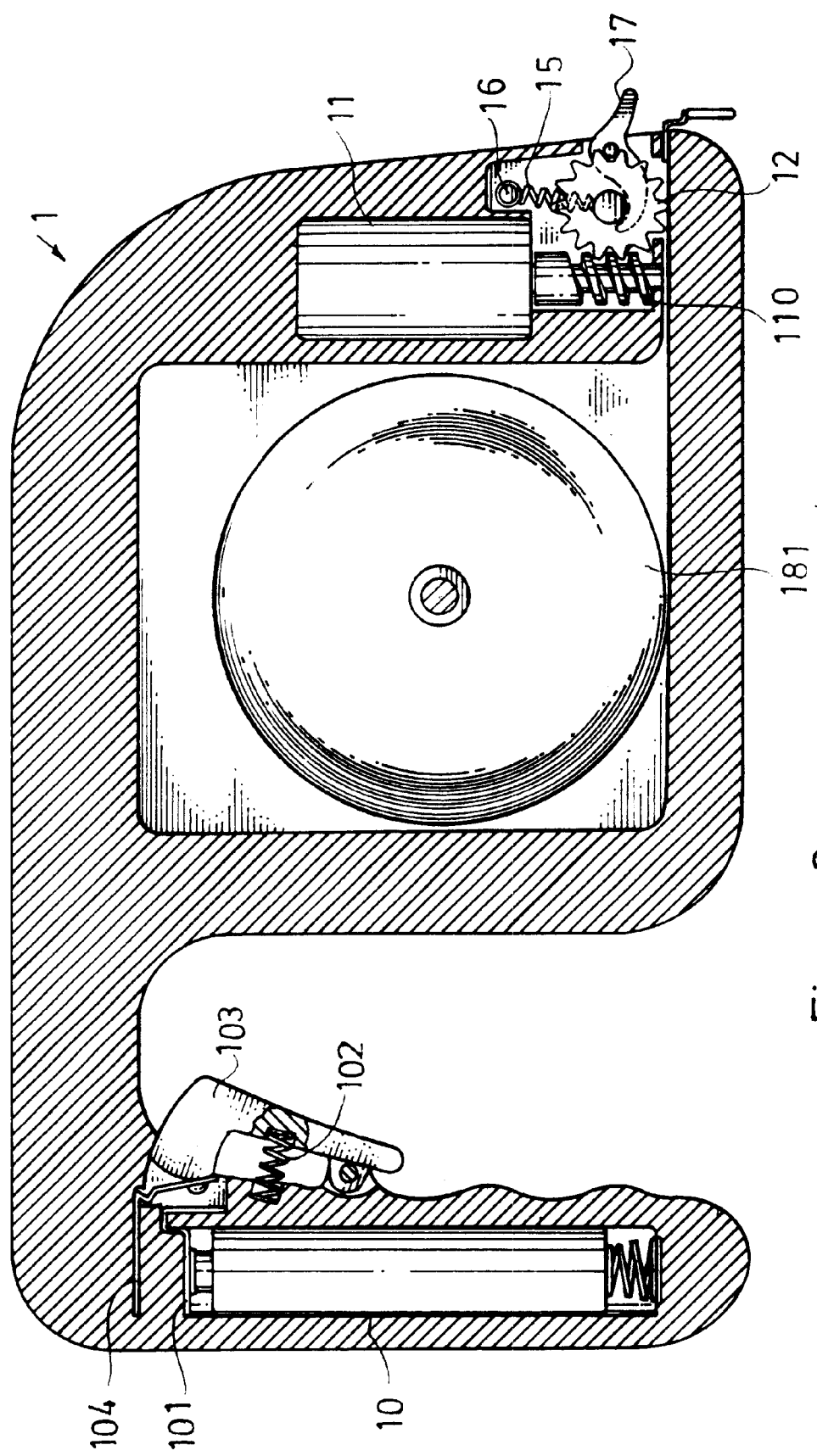
FIG. 2 is a sectional of the broaden type with a handle of the manual/auto dual-mode reversible measuring tape according to the present invention.
Figure 3:
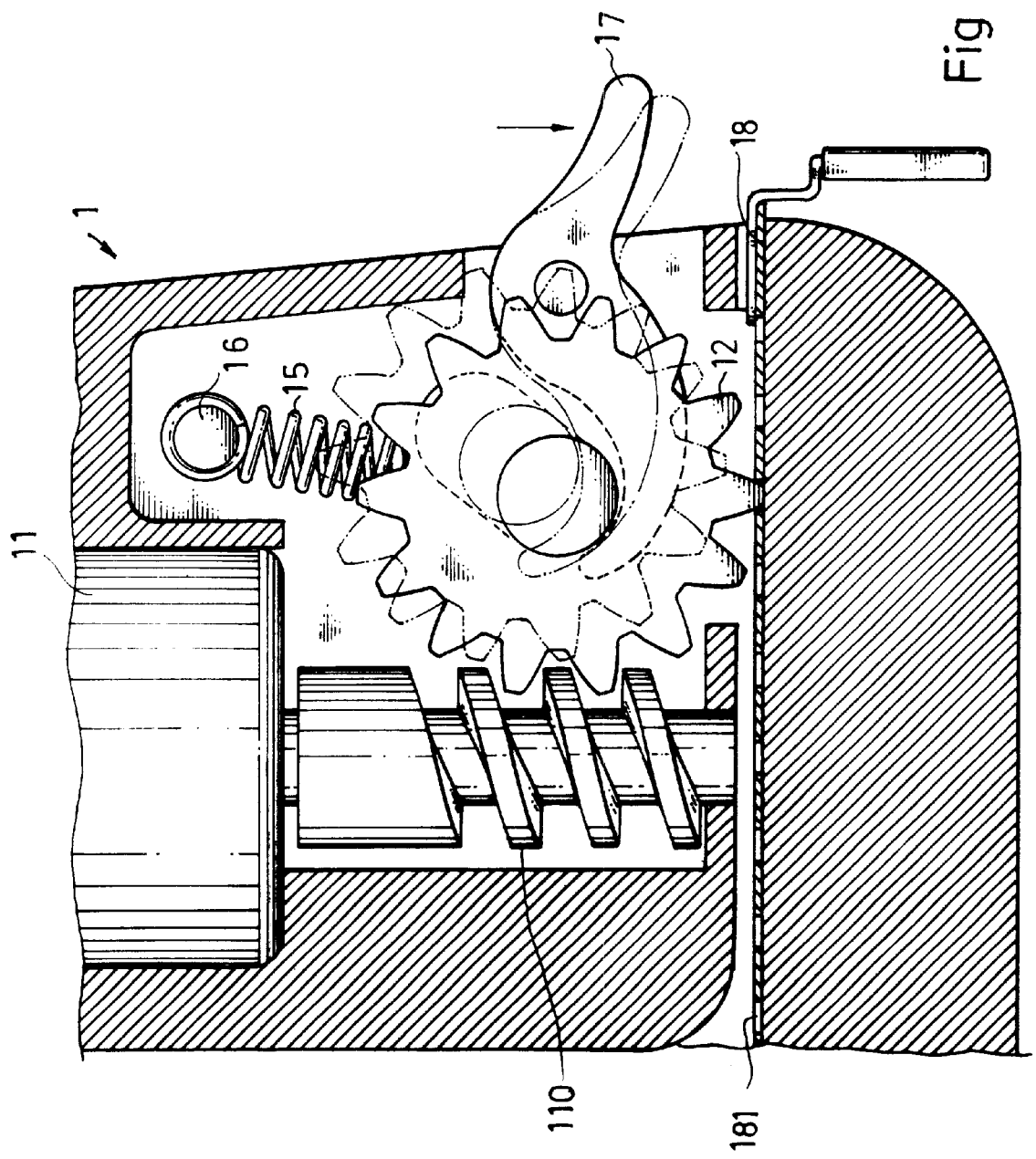
FIG. 3 is a schematic drawing showing the manual/auto control switch switched to the auto position, the gear forced into engagement with the worm according to the present invention.
Figure 4:
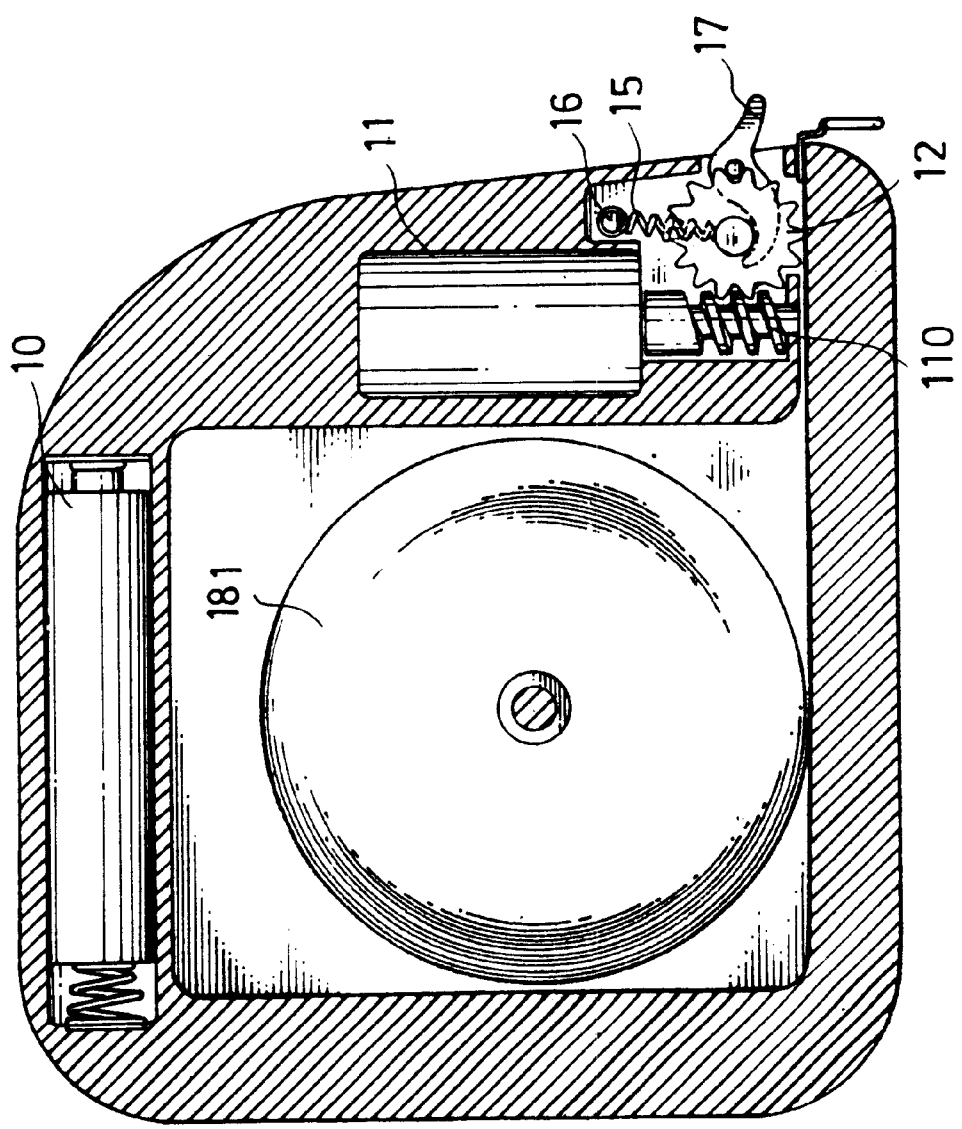
FIG. 4 is a sectional view of the compact type of the manual/auto dual-mode reversible measuring tape according to the present invention.
Figure 6:
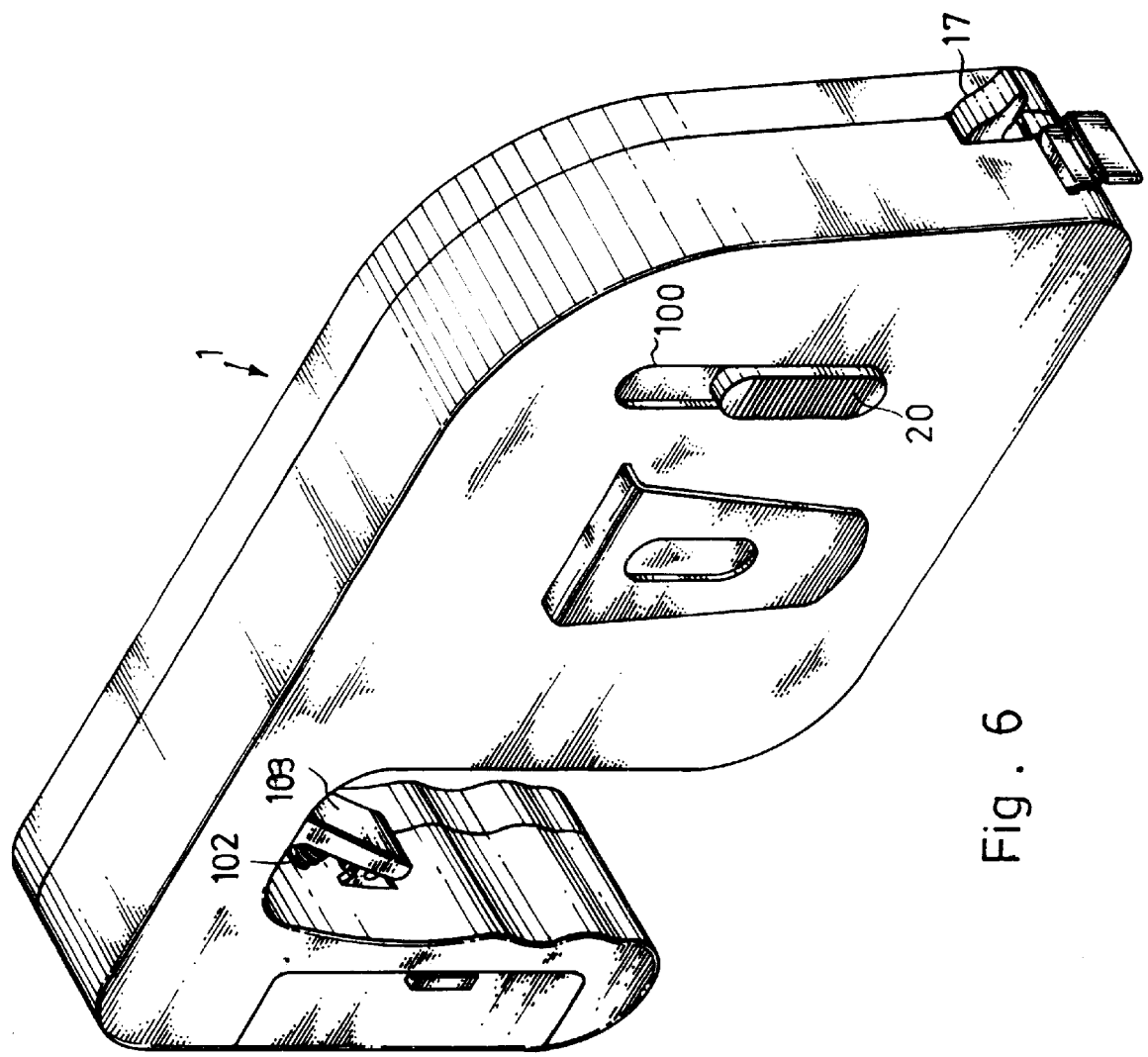
FIG. 6 is an elevational view of FIG. 2.
Figure 7:
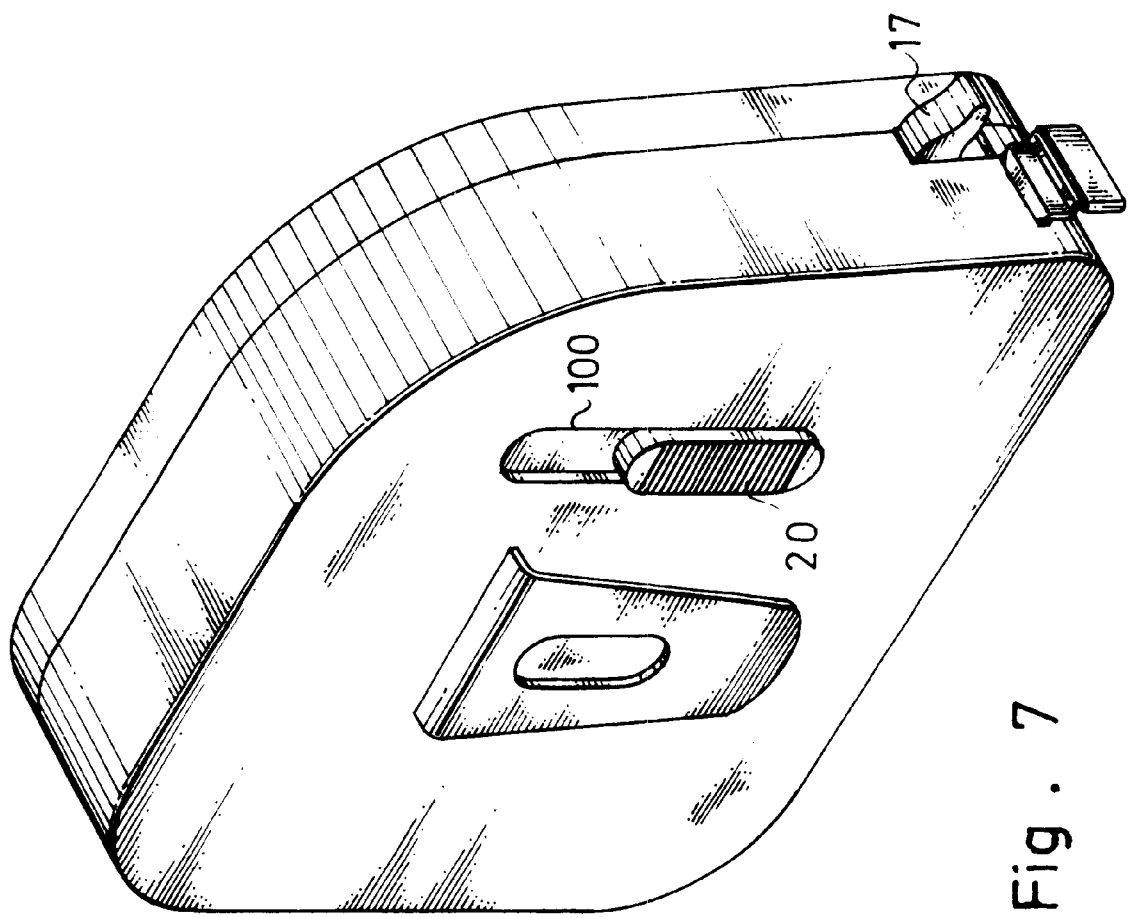
FIG. 7 is an elevational view of FIG. 4.

A measuring tape 1 in accordance with the present invention is provided in one of two different shapes. The measuring tape shown in FIGS. 2 and 6 is a broaden type with a handle. The measuring tape shown in FIGS. 4 and 7 is a compact type.

Referring to FIGS. from 1 through 4, a measuring tape 1 in accordance with the present invention comprises a direct current power source (the battery) 10, a reversible direct current motor 11, which obtains the necessary working voltage from the direct current power source 10, a worm 110 integral with the output shaft of the direct current motor 11, a transversely extended gear shaft 13, a gear 12 mounted on the gear shaft 13 and meshed with the worm 110, a bush 14 fastened to the gear shaft 13 to fixedly secure the gear 12 to the gear shaft 13 and moved with the gear shaft 13 between two distal ends of an elongated sliding slot 100, a locating rod 16 disposed in parallel to and spaced from the gear shaft 13, a spring 15 connected between the locating rod 16 and the gear shaft 13 to hold the gear shaft 13 and the bush 14 at one end of the elongated sliding slot 100, a slide 20 connected to one end of the bush 14 and disposed outside the housing of the measuring tape 1, and a manual/auto control switch 17 of substantially S- profile adapted to move the gear shaft 13 and the bush 14 between two distal ends of the elongated sliding slot 100, and a tape 18 marked with marks for measuring. The tape 18 has a longitudinal series of tooth holes 181 aligned between two distal ends thereof. The spring 15 holds the gear shaft 13 at one end of the elongated sliding slot 100, where the gear 12 is disengaged from the toothed holes 181 of the tape 18. When switching the manual/auto control switch 17 to the auto position, the gear 12 is forced into engagement with the tooth holes 181 of the tape 18, enabling the tape 18 to be automatically moved in and out of the housing of the measuring tape 1 by the reversible direct current motor 11. On the contrary, when switching the manual/auto control switch 17 to the manual position, the gear 12 is disengaged from the toothed holes 181 of the tape 18. In the case, the tape 18 must be pulled in and out of the housing of the measuring tape 1 by hand.

Figure 5:
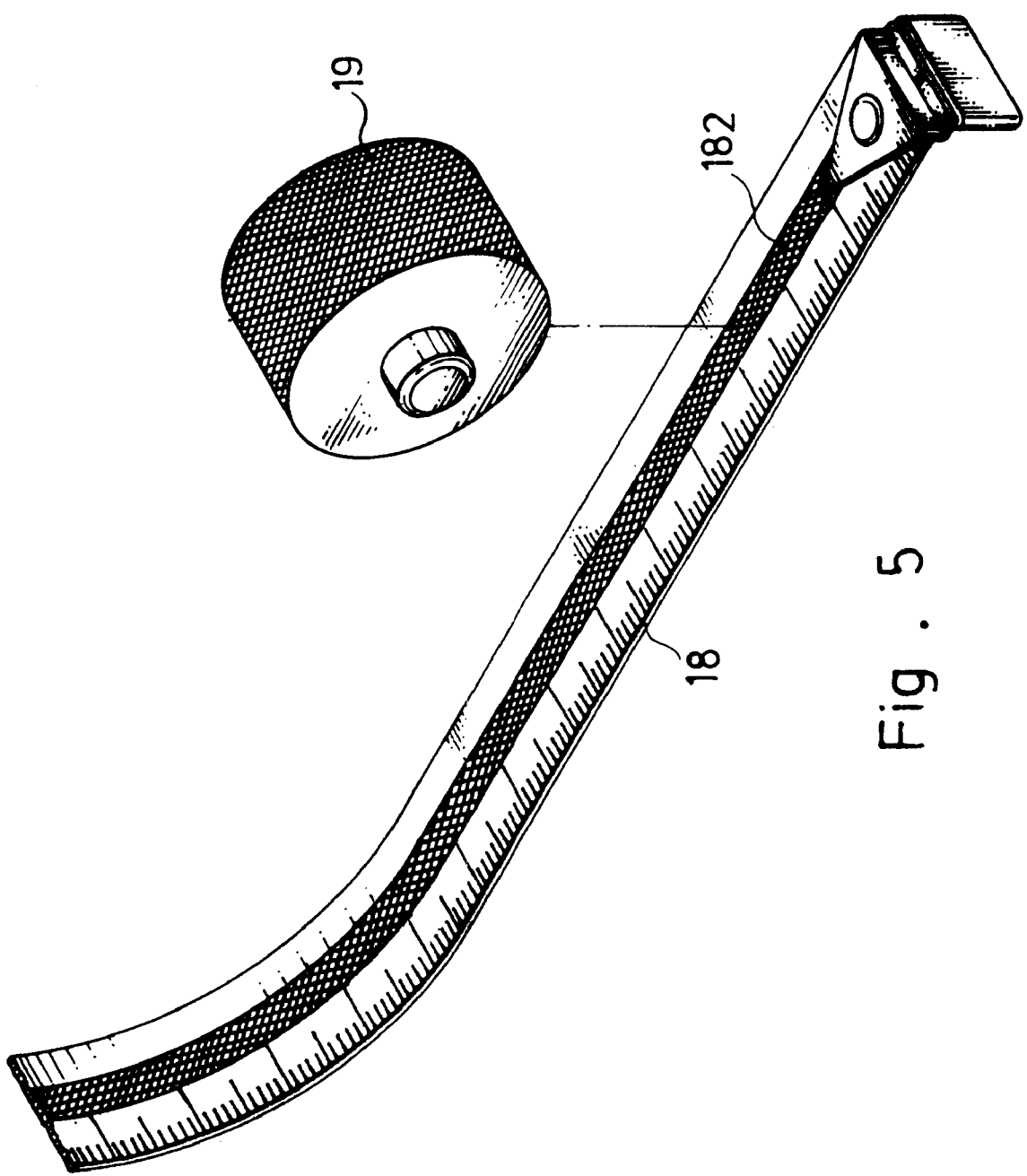
FIG. 5 is an exploded view of an embossed wheel and a tape with a friction strip according to an alternate form of the present invention.

As an alternate form of the present invention as shown in FIG. 5, the tape 18 is made having a longitudinal line of friction strip 182 on the middle instead of the aforesaid tooth holes 181, and an embossed wheel 19 is used instead of the aforesaid gear 12 for working with the friction strip 182 to move the tape 18 in and out of the housing of the measuring tape 1.

Referring to FIGS. 2 and 6 again, the direct current power source 10 has one end, namely, the negative terminal constantly electrically connected to the negative pole of the reversible direct current motor 11, and an opposite end, namely, the positive terminal connected to the positive pole of the reversible direct current motor 11 by a power switch, which comprises a first metal contact plate 101 disposed in contact with the positive terminal of the direct current power source 10, a button 103 pivoted to the housing of the measuring tape 1, a second metal contact plate 104 fixedly connected to one end of the button 103 and electrically connected to the positive pole of the reversible direct current motor 11, and a spring 102 connected between the housing of the measuring tape 1 and the button 103. The spring 102 imparts a pressure to the button 103 to move the second metal contact plate 104 away from the first metal contact plate 101. When pressing the button 103, the second metal contact plate 104 is forced into contact with the first metal contact plate 101 to close the circuit, thereby causing the direct current power source 10 and the reversible direct current motor 11 to be electrically connected. Further, a forward/backward control switch (not shown) is provided for controlling the direction of rotation of the reversible direct current motor 11.

It is to be understood that the drawings are designed for purposes of illustration only, and are not intended for use as a definition of the limits and scope of the invention disclosed.

What is claimed is:

1. A manual/auto dual-mode reversible measuring tape comprising:

a housing having an elongated sliding slot;

a direct current power source mounted inside said housing;

a tape marked with marks for measuring and received inside said housing, said tape comprising a first end fixedly disposed inside said housing, a second end disposed outside said housing, and a longitudinal series of tooth holes extended between said first end and said second end;

a reversible direct current motor controlled to move said tape in and out of said housing, said reversible direct current motor comprising a worm integral with an output shaft thereof;

a transverse shaft coupled to said housing and moved between two distal ends of said elongated sliding slot;

a gear fixedly mounted on said transverse shaft and meshed with said worm and adapted to mesh with the tooth holes of said tape and to move said tape in and out of said housing;

spring means mounted inside said housing to hold said transverse shaft in one end of said elongated sliding slot where said gear is disengaged from the tooth holes of said tape;

a manual/auto control switch adapted to move said transverse shaft between a first end of said elongated sliding slot where said gear is forced into engagement with the toothed holes of said tape for enabling said tape to be automatically moved in and out of said housing upon rotation of said reversible direct current motor, and a second end of said elongated sliding slot where said gear is disengaged from the toothed holes of said tape for enabling said tape to be moved in and out of said housing by hand; and a power switch connected between said direct current power source and said reversible direct current motor and adapted to switch on/off said reversible direct current motor.

2. The manual/auto dual-mode reversible measuring tape of claim 1, wherein said power switch comprises a first metal contact plate connected to one end of said direct current power source, a button pivoted to said housing, a second metal contact plate fixedly connected to one end of said button and adapted to connect said first metal contact plate to said reversible direct current motor upon depressing of said button, and spring means connected between said housing and said button to hold said second metal contact plate away from said first metal contact plate.

3. A manual/auto dual-mode reversible measuring tape comprising:

a housing having an elongated sliding slot;

a direct current power source mounted inside said housing;

a tape marked with marks for measuring and received inside said housing, said tape comprising a longitudinal line of friction strip extended on the middle between two distal ends thereof, a transverse shaft coupled to said housing and moved between two distal ends of said elongated sliding slot;

an embossed wheel fixedly mounted on said transverse shaft and adapted to mesh with the tooth holes of said tape and to move said tape in and out of said housing;

a reversible direct current motor adapted to rotate said embossed wheel;

spring means mounted inside said housing to hold said transverse shaft in one end of said elongated sliding slot where said embossed wheel is disengaged from the friction strip of said tape;

a manual/auto control switch adapted to move said transverse shaft between a first end of said elongated sliding slot where said embossed wheel is forced into engagement with the friction strip of said tape for enabling said tape to be automatically moved in and out of said housing upon rotation of said reversible direct current motor, and a second end of said elongated sliding slot where said embossed wheel is disengaged from the friction strip of said tape for enabling said tape to be moved in and out of said housing by hand; and a power switch connected between said direct current power source and said reversible direct current motor and adapted to switch on/off said reversible direct current motor.

4. The manual/auto dual-mode reversible measuring tape of claim 3, wherein said power switch comprises a first metal contact plate connected to one end of said direct current power source, a button pivoted to said housing, a second metal contact plate fixedly connected to one end of said button and adapted to connect said first metal contact plate to said reversible direct current motor upon depressing of said button, and spring means connected between said housing and said button to hold said second metal contact plate away from said first metal contact plate.

* * * * *